(12) United States Patent
Hamon et al.

(10) Patent No.: US 6,553,894 B1
(45) Date of Patent: Apr. 29, 2003

(54) DRIP-TYPE COFFEE-MAKER COMPRISING A WATER TREATMENT DEVICE

(75) Inventors: Jean-Pierre Hamon, Laize la Ville (FR); Pascal Marlin, Cairon (FR)

(73) Assignee: Moulinex S.A., Cormelles le Royal (FR)

( * ) Notice: Subject to any disclaimer, the term of this patent is extended or adjusted under 35 U.S.C. 154(b) by 0 days.

(21) Appl. No.: 09/830,650

(22) PCT Filed: Oct. 6, 1999

(86) PCT No.: PCT/FR99/02396

§ 371 (c)(1),
(2), (4) Date: Jul. 30, 2001

(87) PCT Pub. No.: WO00/25644

PCT Pub. Date: May 11, 2000

(30) Foreign Application Priority Data

Oct. 30, 1998 (FR) ............................................. 98 14108

(51) Int. Cl.⁷ ................................................. A47J 31/60
(52) U.S. Cl. ............................. 99/286; 99/279; 99/280
(58) Field of Search ......................... 99/286, 285, 295, 99/298, 307, 279, 280

(56) References Cited

U.S. PATENT DOCUMENTS

| 4,889,041 A | * | 12/1989 | Mahlich et al. | ........... 99/286 X |
| 5,860,354 A | * | 1/1999 | Jouatel et al. | ................. 99/286 |
| 5,944,973 A | * | 8/1999 | Hall | ......................... 99/286 X |

FOREIGN PATENT DOCUMENTS

| DE | 92 07 977 | 11/1992 |
| EP | 0 499 689 | 8/1992 |
| EP | 0 723 940 | 7/1996 |
| FR | 2 757 364 | 6/1998 |

* cited by examiner

Primary Examiner—Reginald L. Alexander
(74) Attorney, Agent, or Firm—Young & Thompson

(57) ABSTRACT

A drip-type coffee-maker includes a water reservoir (1) supplying a water-heater with continuous circulation (6), and a device (9) for treating the water in the reservoir with a water-soluble scale preventive agent. The water treating device (9) includes an element (10) for measuring out an amount of scale preventive agent (23) which is determined on the basis of the volume of water supplied to the water-heater (6) and which is injected into the water.

6 Claims, 5 Drawing Sheets

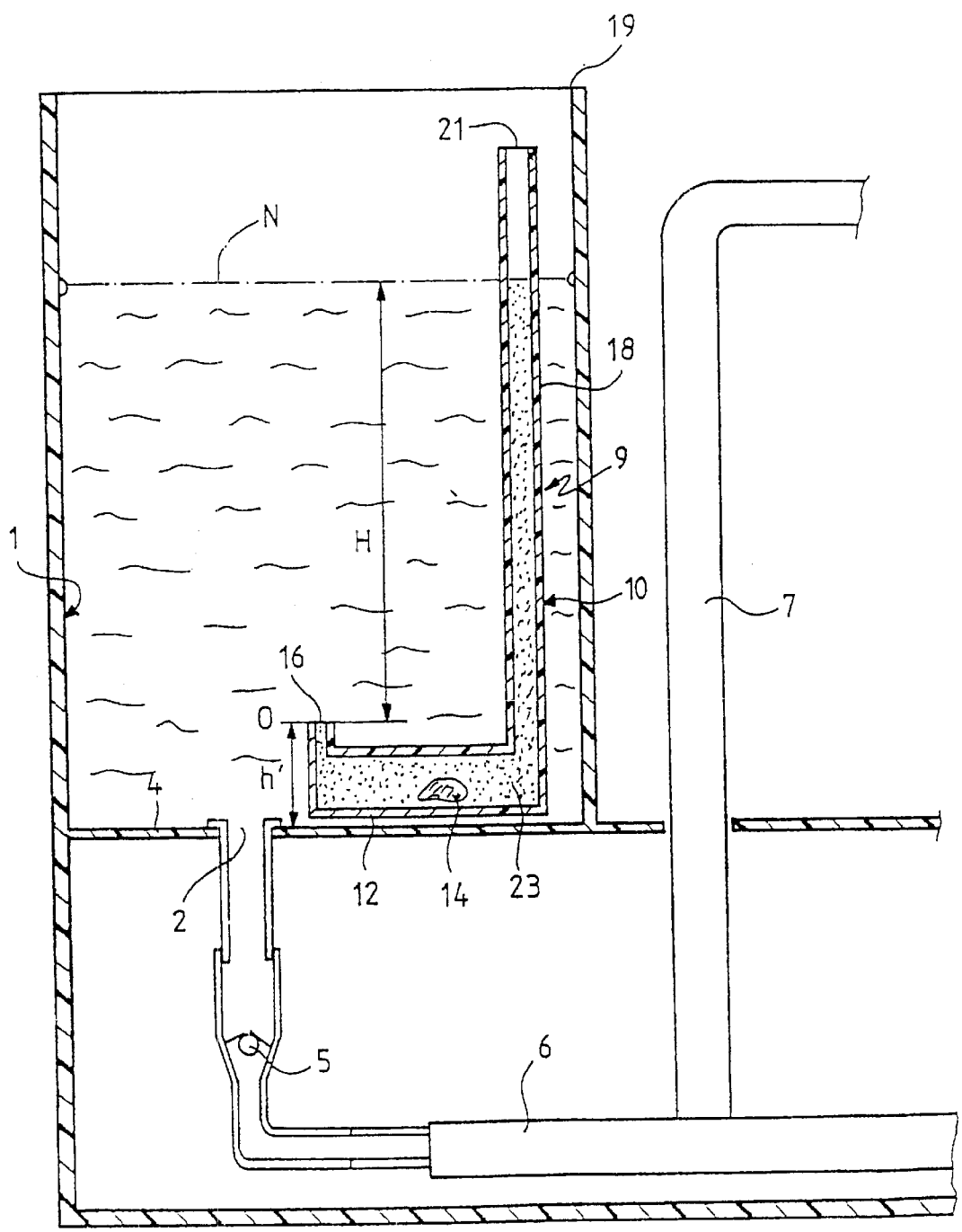
FIG_1

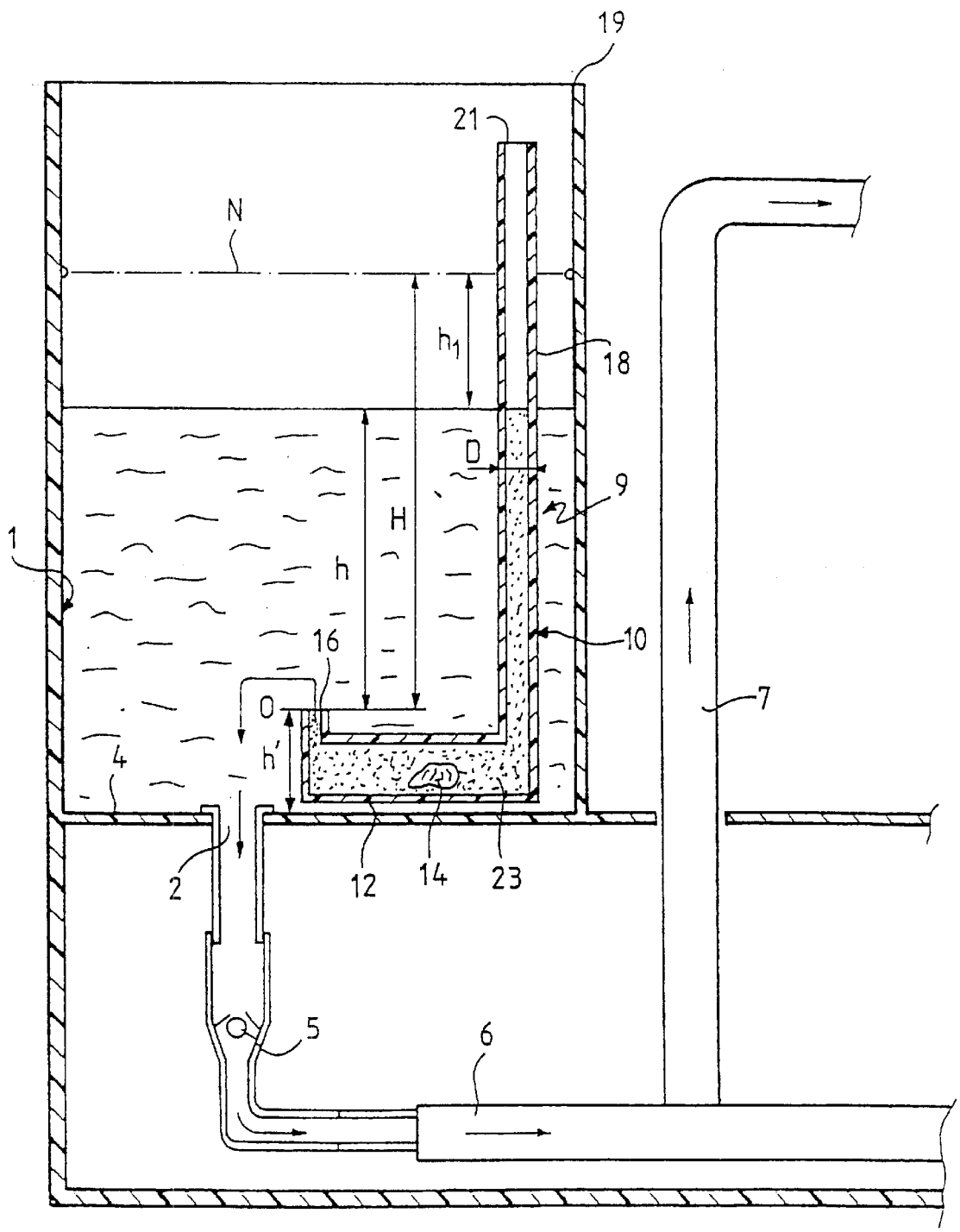
FIG_2

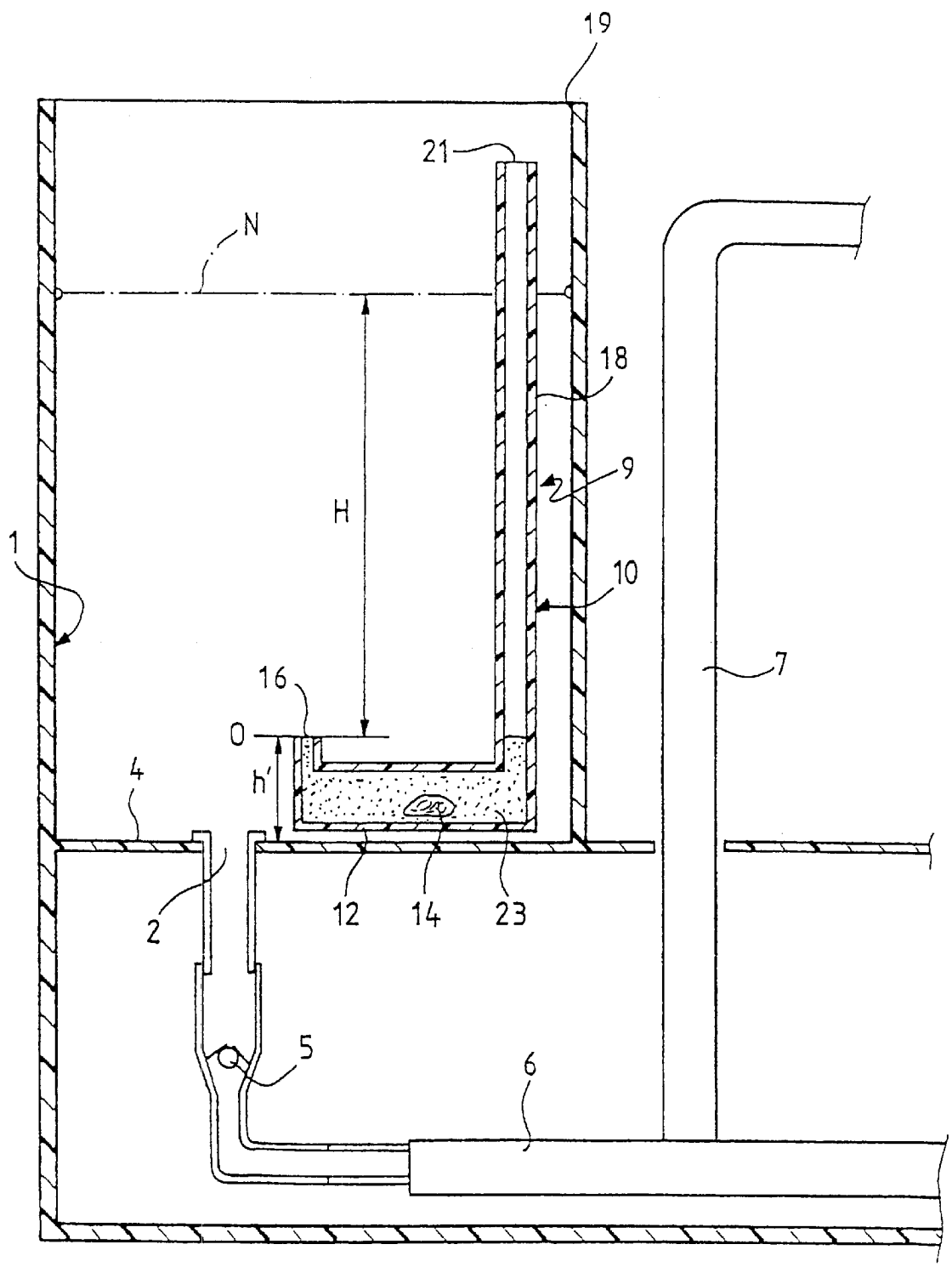
FIG_3

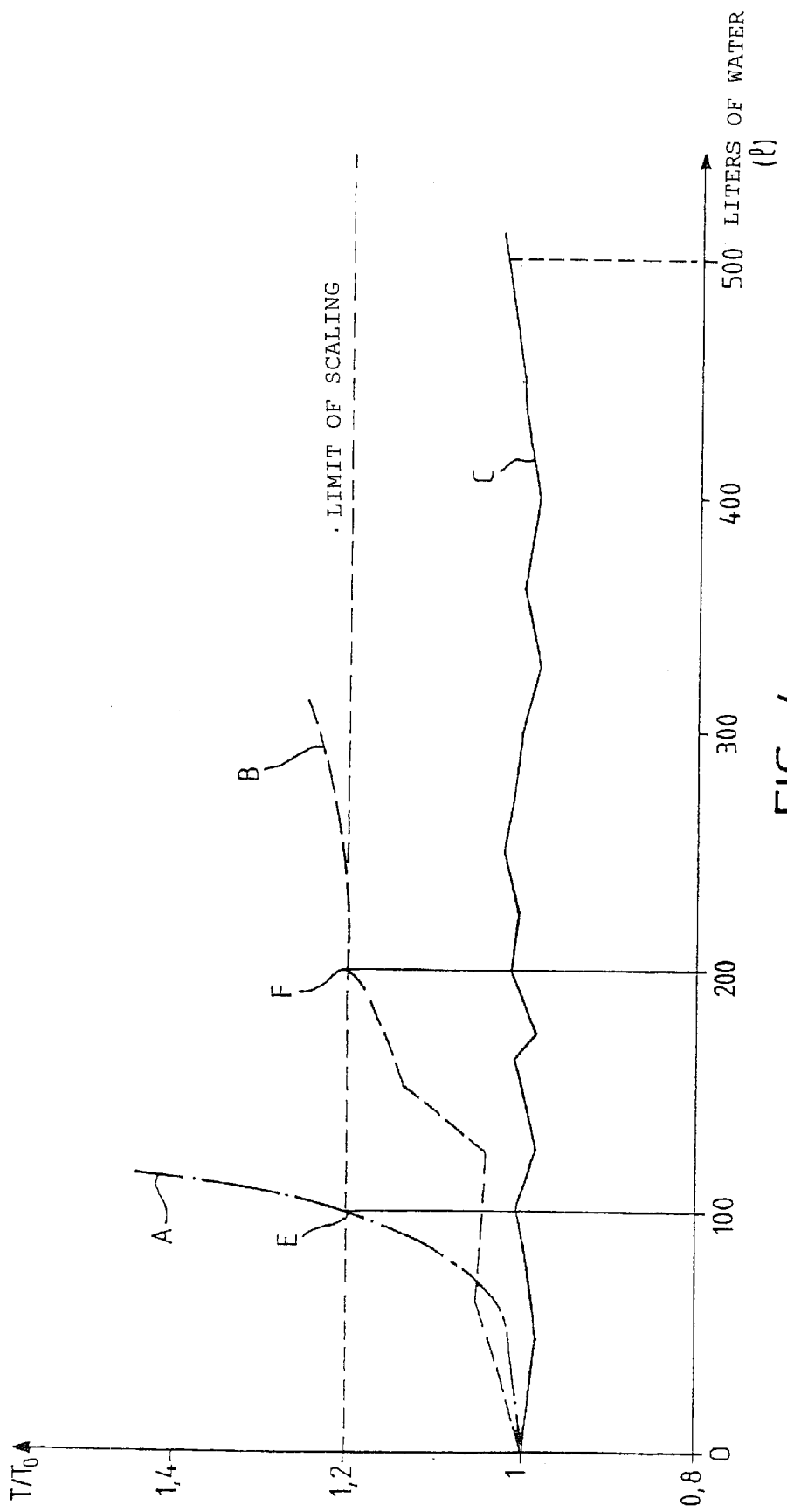
FIG_4

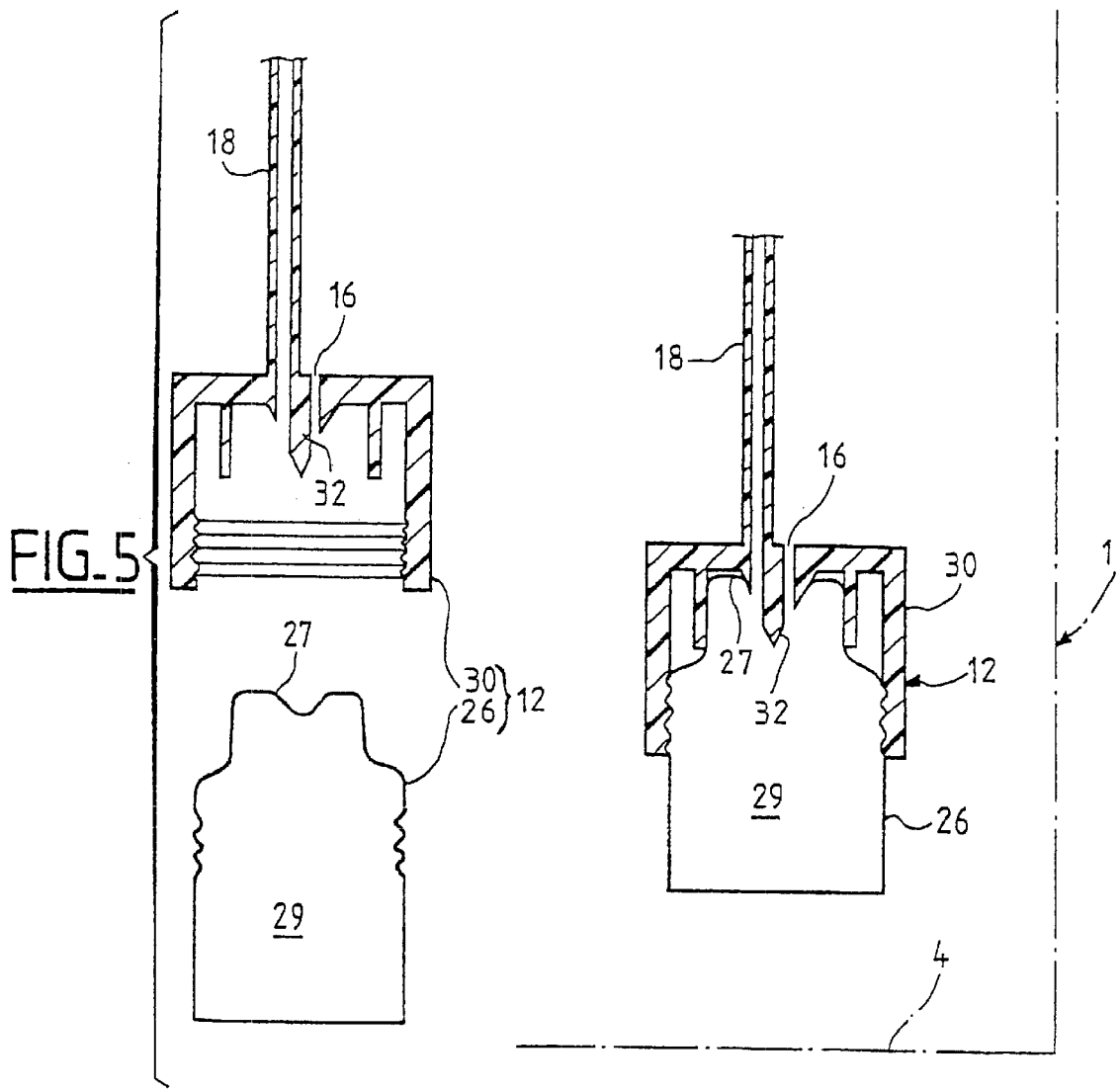

DRIP-TYPE COFFEE-MAKER COMPRISING A WATER TREATMENT DEVICE

CROSS REFERENCE TO RELATED APPLICATION

This is the 35 USC 371 national stage of international application PCT/FR99/02396 filed on Oct. 6, 1999, which designated the United States of America.

FIELD OF THE INVENTION

The present invention relates to a household drip coffeemaker comprising a cold water reservoir supplying a water heater with continuous circulation, and a device adapted to treat the water contained in the reservoir with an anti-scaling agent that is soluble or in solution.

BACKGROUND OF THE INVENTION

In a known coffeemaker of this type, the water treatment device comprises a cartridge which is arranged in the filling opening of the reservoir by being entirely maintained above the maximum filling level of the reservoir, which comprises a cover and a perforated bottom, and which contains a soluble anti-scaling agent of the type constituted conventionally by one or several polyphosphate crystals, whose dissolution can take place only during rapid flow of the water filling the reservoir. However, with this type of treatment device of the water with a polyphosphate crystal, it happens that the quantity of phosphorus which is added to the water is not absolutely controlled with precision to retard sufficiently over time the scaling of the water heater of the coffeemaker; thus, practice shows that in the case of habitual use of the coffeemaker (for example twice a day), the quantity of phosphorus added is substantially zero because the crystals have not the time to dissolve sufficiently between two cycles of operation of the coffeemaker, thus leading to rapid scaling of the water heater, whilst in the case of intensive use of the coffeemaker (for example all the time), the quantity of phosphorus added exceeds the value permitted by the laws in force, according to which the concentration of phosphorus in the water must be less than 5 mg/l expressed as $P_2O_5$.

SUMMARY OF THE INVENTION

The invention has particularly for its object to overcome these drawbacks and to provide a household drip coffeemaker provided with a device for treating water with an anti-scaling agent that is soluble or in solution, whose added quantity in the water will be perfectly controlled while respecting the laws in force, and this no matter what the frequency of use of the coffeemaker and the solubility of the anti-scaling agent.

According to the invention, the water treatment device comprises a device for micro-dosing a quantity of anti-scaling agent which is predetermined as a function of the volume of water supplied to the water heater and which is injected into the water.

Thanks to this micro-dosing arrangement, the quantity of anti-scaling agent injected into the water is thereafter controlled with high reliability and, moreover, because of its injection at a very low dosage rate, has the unexpected result of retarding considerably over time the scaling of the water heater of the coffeemaker.

BRIEF DESCRIPTION OF THE DRAWINGS

The characteristics and advantages of the invention will become further apparent from the description which follows, given by way of non-limiting example, with reference to the accompanying drawings, in which:

FIG. 1 is a fragmentary schematic view in vertical cross-section of a coffeemaker according to the invention, comprising a water treatment device, the reservoir of the coffeemaker being full of water;

FIG. 2 is a view similar to FIG. 1, showing the water reservoir partially empty;

FIG. 3 is a view similar to FIG. 2 after complete emptying of the reservoir;

FIG. 4 shows, as a function of the number of liters of water poured into the reservoir of a same coffeemaker, the development of the passage time of the water into the coffeemaker when this latter has no water treatment device (curve A), when the coffeemaker comprises a water treatment device held above the maximum level of filling of the reservoir (curve B), and when the coffeemaker comprises a water treatment device according to the invention (curve C); and FIGS. 5 and 6 show an example of an embodiment of a water treatment cartridge comprising a bottle of anti-scaling agent in liquid form and a cap, respectively before mounting (FIG. 5) and after mounting (FIG. 6) of the cap on the bottle.

DETAILED DESCRIPTION OF THE INVENTION

In FIGS. 1 to 3, there is shown only a portion of a household coffeemaker of the drip type comprising a cold water reservoir 1 with a capacity defined by a maximum filling level shown at N and whose outlet 2 forming a mouthpiece provided in the bottom wall 4 is connected, via a non-return valve 5, to the inlet of an electric heating body formed by a water heater 6 with continuous circulation whose outlet supplies by an ascending tube 7 a spray spout of a filter (not shown) adapted to receive ground coffee and disposed above an infusion collecting pourer (not shown).

The coffeemaker shown in FIGS. 1 to 3 is moreover provided with a water treatment device, designated by the general reference numeral 9, using an anti-scaling agent that is soluble or in solution, such as a complexing agent based on polyphosphates, adapted to be added to the water so as to retard scaling of the coffeemaker.

The complexing agent based on polyphosphates is preferably in solid form (crystal, granules), but can also be in powder or liquid form.

According to the invention, the water treatment device 9 comprises a device 10 for micro-dosing a quantity of anti-scaling agent which is predetermined as a function of the volume of water supplied to the water heater 6 and which is injected into the water.

As shown in FIGS. 1 to 3, the micro-dosing device 10 is preferably removably mounted within the reservoir 1 by being arranged adjacent the outlet 2 for emptying the reservoir, and is adapted to inject rapidly a small dose of anti-scaling agent into the water supplied to the water heater 6 (FIG. 2).

According to a preferred embodiment of the invention, the micro-dosing device 10 comprises a cartridge 12 of predetermined volume, for example 30 $cm^3$, which contains the anti-scaling agent, for example a single crystal of polyphosphate 14 of predetermined weight, for example 1.66 gram, and which has at its upper portion a calibrated opening 16 as well as a capillary tube 18 communicating with the interior of the cartridge 12 and rising, preferably vertically, toward the filling opening 19 of the reservoir 1 by having an upper opening 21 which is located above the maximum level N of the reservoir. The capillary tube 18 preferably has a cylindrical shape, of a predetermined diameter, for example equal to 1.5 millimeter.

As to FIG. 1, during filling of the reservoir 1 to a maximum water height H, predetermined from a so-called zero reference level defined by the opening 16 of the cartridge 12, and corresponding to a number of cups of coffee selected by the user and varying generally from 3 to 15 cups, the poured water penetrates the cartridge 12 through the opening 16 and comes into contact with the polyphosphate crystal 14 which, by dissolution, generates a concentrated phosphorus solution, designated at 23 in FIGS. 1 to 3; the capillary tube 18 fills with this concentrated phosphorus solution substantially to the same level as the level of water in the reservoir 1, see FIG. 1.

During operation of the coffeemaker, the reservoir 1 begins to empty, and if the user decides to stop the emptying of the reservoir, for example after a height $h_1$ of water has been emptied, as shown in FIG. 2, which is equal to (H–h) wherein h is the height of the water remaining in the reservoir measured from the zero reference level and varying from 0 to H, the level of the capillary tube 18 lowers by the same height $h_2$ and solution 23 concentrated in phosphorus is ejected at a low dosage through the calibrated opening 16 of the cartridge to be mixed with the water supplied to the water heater 6, by the phenomenon known as hot water pumping.

Thus, the volume of concentrated phosphorus solution 23 which is added to the water supplied to the water heater during this emptying, FIG. 2, is proportional to the emptied water height $h_1$.

More generally, in the case of a capillary tube 18 of cylindrical shape, of predetermined diameter D, the volume (V) of solution 23 concentrated in phosphorus which is added to the water during emptying of the reservoir 1 is given by the expression:

$$V = 3,14 \times (H-h) \times (D)^2 / 4$$

wherein:

H is the height of water corresponding to the selected number of cups of coffee;

h is the water height at filling and at emptying of the reservoir, and varies from 0 to H.

It will be noted that the reference level zero defined by the opening 16 of the cartridge 12 is located, relative to the bottom wall 4 of the reservoir 1, at a predetermined height h', for example of the order of 10 millimeters, so as to remove from the cartridge 12, during emptying of the reservoir (FIG. 2), a solution perfectly homogeneous in phosphorus.

After complete emptying of the reservoir 1 of the coffeemaker 1, as shown in FIG. 3, the cartridge 12 remains empty of solution 23 concentrated in phosphorus, the level of the capillary tube 18 coming to equilibrium at the zero reference level.

By way of purely illustrative example, given a cylindrical capillary tube 18 of a diameter D equal to 1.5 millimeter and considering a water height H equal to 131 millimeters and corresponding to a volume of water in the reservoir equal to 1.4 liter, the volume of concentrated phosphorus solution which is added to the water during complete emptying of the reservoir for which h=0, is equal to 1.23 milliliter, which is particularly small.

Thus, this micro-dosing device 10 constitutes preferably a simple, economic, precise and particularly reliable apparatus. Moreover, it permits delivering or diffusing into the water a quantity of polyphosphate-based complexing agent which is perfectly controlled, with very little bother, which is independent of the solubility of the polyphosphate crystal 14, and which is proportional to a water height in the reservoir, hence preferably independent of the volume of water in the reservoir.

Moreover, by suitable dimensioning of its constituents, namely essentially the weight of the polyphosphate crystal 14, the volume of the cartridge 12 as well as the geometry of the capillary tube 18, this micro-dosing device 10, by injection into the water of a small quantity of polyphosphate-based completing agent, permits, on the one hand, maintaining a concentration or quantity of phosphate in the water at a value of the order of 1 mg/l expressed as $P_2O_5$, thereby respecting fully the existing legislation in force according to which the concentration of phosphorus in the treated water, at the outlet of the coffeemaker, must be below 5 mg/l expressed as $P_2O_5$, and on the other hand, to retard considerably over time the scale forming in the water heater at least up to 500 liters of water.

Thus, a very low concentration of phosphorus in the water supplied to the water heater of the coffeemaker, with the help of this micro-dosage device 10, permits, in a surprising manner, to treat effectively a very large number of liters of water without scaling of the water heater, thereby increasing in a very significant way the lifetime of the coffeemaker.

Referring now to FIG. 4, there are shown different experimental curves A, B and C each illustrating the development over time of the passage of water into the coffeemaker, expressed by the ratio $T/T_0$ in which T is the time of passage of the water when the reservoir is full of water and $T_0$ is equal to the time of passage of the water when the reservoir is full of water, but measured at the end of a first test cycle, this latter comprising a sequence of filling the reservoir, followed by a sequence of operation of the coffeemaker, then a sequence of cooling of the coffeemaker, as a function of the number of liters of water poured into the coffeemaker. Conventionally, it is considered that a coffeemaker is scaled up when the ratio $T/T_0$ is equal to 1.2, corresponding to an increase of the time of passage of the water, of 20%.

The curves A, B and C derive from tests from supplying a same coffeemaker with water of a hardness of about 44° TH (French).

Curve A has been given for a coffeemaker not equipped with a water treatment device and shows that scaling of the coffeemaker takes place for about 100 liters of water (point E).

Curve B is given for the same coffeemaker, but provided with a water treatment device according to the prior art, namely a perforated cartridge maintained above the maximum filling level of the water and containing a crystal of polyphosphate of a weight of 1.66 gram. This curve B shows that scaling of the coffeemaker takes place at about 200 liters of treated water (point F).

As to curve C, it is given again for the same coffeemaker, but provided with the micro-dosing device 10 according to the invention, as described above. For these tests, the volume of the cartridge 12 of the micro-dosing device 10 is selected to be equal to 30 cm³, said cartridge 10 contains a single crystal of polyphosphate 14 of a weight equal to 1.66 gram, and the capillary tube 18 is of cylindrical shape, of a diameter equal to 1.5 millimeter. Thanks to this micro-dosing device permitting controlling with precision the quantity of phosphorus added to the water supplied to the water heater of the coffeemaker, the curve C shows clearly that the scaling of the water heater does not take place for 500 liters of treated water.

The tests thus carried out have shown the effectiveness of the micro-dosing device according to the invention, in a drip coffeemaker, both as to considerable delay of scaling of the water heater of the coffeemaker (by scaling at 100 liters of water), but also as to maintaining a low value of the concentration of phosphorus in the water (of the order of 1 mg/l expressed as $P_2O_5$), and this while using a simple and reliable technology.

With respect to FIGS. 5 and 6, in which the elements identical to those described above have the same reference numerals, there will be described a particular embodiment of the micro-dosing device.

The cartridge 12, FIG. 5, is comprised of a bottle 26 hermetically sealed at its upper portion 27 and filled, under controlled atmosphere, with a liquid solution 29 of polyphosphates at a given concentration and by a cap 30 which is mounted removably, for example by screwing, on the bottle 26.

As shown in FIG. 5, the cap 30 is provided at its upper portion with the calibrated opening 16 and with the capillary tube 18, and comprises internally a perforation member 32 adapted to pierce the upper portion 27 of the bottle 26 upon screwing of the cap 30, such that the opening 16 and the capillary tube 18 both open into the perforated portion of the bottle 26 (see FIG. 6). After screwing the cap 30 onto the bottle 26, the cartridge 12 thus provided is mounted within the reservoir 1 of the coffeemaker, as shown in FIG. 6.

In addition to the fact that the cartridge 12 is of a particularly simple construction, it should be noted that the liquid solution 29 contained in the sealed bottle 26 is preferably homogeneous as to phosphorus and perfectly aseptic.

What is claimed is:

1. In a drip coffeemaker, comprising:

a reservoir of cold water having an outlet;

a water treatment device for continuously treating the water in the reservoir with an anti-scaling agent;

a water heater fluidly connected to the outlet of the reservoir;

a filter operatively associated with an outlet of the water heater and adapted to receive ground coffee; said filter being disposed above an infusion collecting receptacle;

the improvement wherein the water treatment device comprises a micro-dosing device for injecting a small quantity of anti-scaling agent into the water in the reservoir; said quantity being determined as a function of the volume of water supplied to the water heater.

2. The drip coffeemaker according to claim 1, wherein the micro-dosing device is arranged adjacent the outlet of the reservoir.

3. The drip coffeemaker according to claim 2, wherein the anti-scaling agent is a polyphosphate base complexing agent; the micro-dosing device comprising a cartridge containing the complexing agent, mounted within the reservoir and having at its upper portion a calibrated opening through which water enters during filling of the reservoir and which communicates, after passage of the water into the cartridge, with a capillary tube of a predetermined cross-section; said capillary tube rising towards a filling opening of the reservoir, and having an upper opening located above the maximum filling of the reservoir, such that during filling of the reservoir to a given level, the capillary tube fills with complexing agent substantially to the same level as the given water level, while during emptying of the reservoir to a given height of water, the predetermined quantity of complexing agent escaping through the calibrated opening of the cartridge is proportional to the given height of water effectively emptied from the reservoir.

4. The drip coffeemaker according to claim 3, wherein the complexing agent contained in the cartridge is in the form of a solid whose weight, as well as the volume of the cartridge and the geometry of the capillary tube, are predetermined to maintain in the treated water a phosphorus concentration at a value below 5 mg/l, expressed as $P_2O_5$, and to prevent any scaling of the coffeemaker at least equal to 500 liters of treated water.

5. The drip coffeemaker according to claim 4, wherein the cartridge comprises a bottle hermetically sealed at its upper portion, and filled with complexing agent in the form of liquid, and a cap removably mounted on the bottle; said cap comprising a perforation member for perforating the upper portion of the bottle during its mounting, and including the calibrated opening and the capillary tube, which both open into a perforated portion of the bottle.

6. The drip coffeemaker according to claim 5, wherein the cap includes internal screw threads for screwing on the bottle.

* * * * *